(12) United States Patent
Carrieres

(10) Patent No.: US 9,745,857 B2
(45) Date of Patent: Aug. 29, 2017

(54) SEALING ASSEMBLY

(71) Applicant: Pratt & Whitney Canada Corp., Longueuil (CA)

(72) Inventor: Alain Carrieres, Boucherville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 80 days.

(21) Appl. No.: 14/556,526

(22) Filed: Dec. 1, 2014

(65) Prior Publication Data

US 2016/0153300 A1    Jun. 2, 2016

(51) Int. Cl.
*F01D 11/00* (2006.01)
*F16J 15/34* (2006.01)
*F01D 25/18* (2006.01)

(52) U.S. Cl.
CPC .......... *F01D 11/003* (2013.01); *F01D 25/183* (2013.01); *F16J 15/3468* (2013.01); *F05D 2220/32* (2013.01); *F05D 2240/55* (2013.01)

(58) Field of Classification Search
CPC .. F16J 15/3464; F16J 15/3468; F16J 15/3472; F01D 11/003; F05D 2240/55
See application file for complete search history.

(56) References Cited

U.S. PATENT DOCUMENTS

| 3,964,753 | A | | 6/1976 | Junker et al. | |
|---|---|---|---|---|---|
| 4,088,329 | A | | 5/1978 | Junker | |
| 5,135,235 | A | * | 8/1992 | Parmar | F16J 15/3468 277/360 |
| 5,183,270 | A | * | 2/1993 | Alten | F16J 15/3452 277/397 |
| 5,609,342 | A | * | 3/1997 | Peterson | F16J 15/3412 277/399 |
| 5,626,347 | A | * | 5/1997 | Ullah | F01D 11/003 277/399 |
| 5,639,096 | A | * | 6/1997 | Ullah | F16J 15/3404 277/401 |
| 5,681,047 | A | * | 10/1997 | Klostermann | F16J 15/3468 277/400 |
| 5,938,206 | A | * | 8/1999 | Klosterman | F16J 15/3468 277/358 |
| 6,299,173 | B1 | * | 10/2001 | Lai | F16J 15/3468 277/348 |
| 6,655,695 | B1 | * | 12/2003 | Sund | F01D 11/003 277/358 |
| 8,167,314 | B2 | * | 5/2012 | Ullah | F16J 15/3472 277/370 |

* cited by examiner

*Primary Examiner* — Nicholas L Foster
(74) *Attorney, Agent, or Firm* — Norton Rose Fulbright Canada LLP

(57) ABSTRACT

A seal arrangement for a gas turbine engine includes a seal runner having a sealing lip extending radially outwardly from a root portion to a tip portion. A static seal is mounted in axially opposed facing relationship to the sealing lip. The static seal and the sealing lip define an axial gap therebetween. A point of flexion is provided in the root portion to allow the sealing lip to flex relative to the axial gap under centrifugal loads, and wherein a center of gravity of the sealing lip is disposed radially outwardly from the point of flexion by a first predetermined amount and axially offset from the point of flexion by a second predetermined amount. The first and second predetermined amounts are selected to modulate the centrifugal flexion of the sealing lip so as to compensate at least partially for thermally induced deformation of the sealing lip.

15 Claims, 6 Drawing Sheets

SEALING ASSEMBLY

TECHNICAL FIELD

The application relates generally to gas turbine engines and, more particularly, to sealing assemblies.

BACKGROUND OF THE ART

Gas turbine engines include a plurality of lubricated parts requiring sealing. For instance, various sealing arrangements may be used to keep the lubricating oil around a rotating shaft and its bearing. The sealing arrangements may include a rotating runner and a static seal facing the runner. In use, the runner may deform due to thermal stresses and a sealing lip of the runner facing the static seal move away therefrom. This flexion or deflexion away from the static seal may be so large that it may decrease efficiency of the sealing arrangement. In other cases, a flexion or deflexion of the sealing lip toward the static seal may cause the runner to abut the static seal in excessive amounts and to produce undesired heat and wear.

SUMMARY

In one aspect, there is provided a seal arrangement for a gas turbine engine having a rotary component mounted for rotation about an axis, the seal arrangement comprising: a seal runner mounted to the rotary component for rotation therewith, the seal runner having a sealing lip extending radially outwardly from a root portion to a tip portion, a static seal mounted in axially opposed facing relationship to the sealing lip, the static seal and the sealing lip defining an axial gap therebetween, wherein a point of flexion is provided in the root portion to allow the sealing lip to flex relative to the axial gap under centrifugal loads, and wherein a center of gravity of the sealing lip is disposed radially outwardly from the point of flexion by a first predetermined amount and axially offset from the point of flexion by a second predetermined amount.

In another aspect, there is provided A gas turbine engine comprising: a rotating shaft; an axial seal including: an annular seal runner mounted to the rotating shaft for joint rotation therewith, the annular seal runner having: an axial portion extending axially around the rotating shaft; and a sealing lip extending generally radially outwardly from the axial portion between a root portion and a tip portion, the root portion having a weakening area to allow the sealing lip to flex in a predetermined direction and by a calibrated amount under centrifugal forces during use; and a static seal mounted in axially opposed facing relationship to the sealing lip.

DESCRIPTION OF THE DRAWINGS

Reference is now made to the accompanying figures in which.

DETAILED DESCRIPTION

Figure 1:
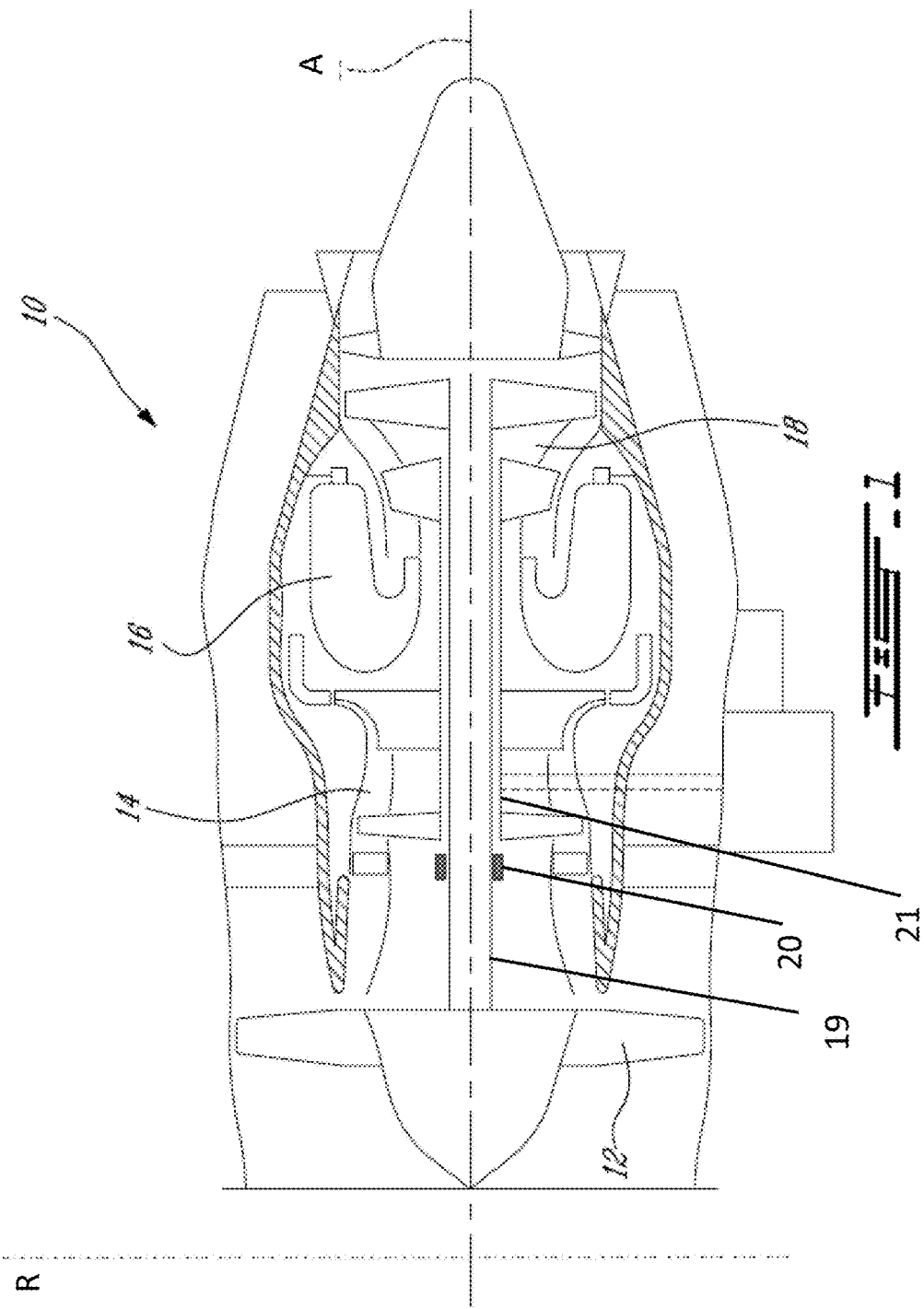
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the low pressure compressor of the compressor section 14, and the low pressure turbine of the turbine section 18 are connected to each other by a low pressure shaft 19. Likewise, the high pressure compressor section and the high pressure turbine are mounted on a high pressure shaft 21. The gas turbine engine 10 may include one or more sealing arrangements 20 disposed around the shafts 19 and 21 (only one example shown around shaft 19 in FIG. 1) for preventing lubricating oil to flow away from the lubricated components. It is understood that the sealing assemblies could be used in different types of gas turbine engines, including turbofan, turboprop, and turboshaft and APU engines.

Figure 2:
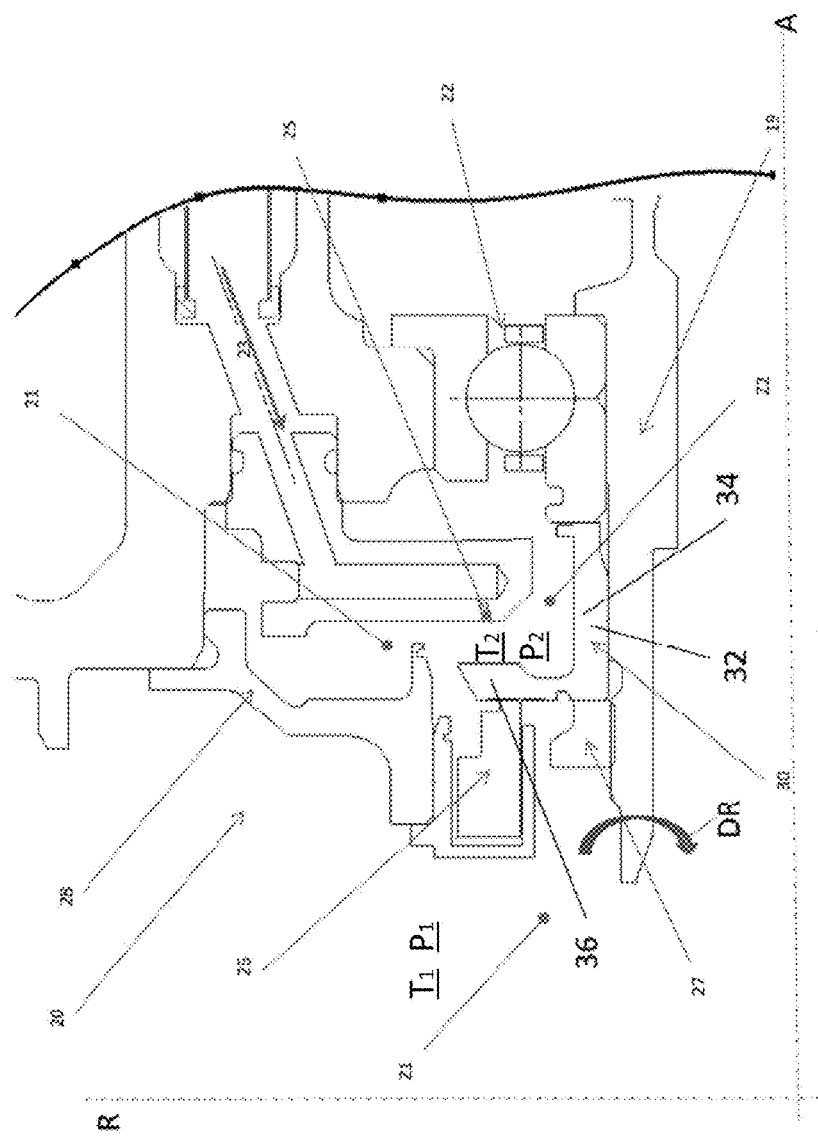
FIG. 2 is a partial schematic view of a portion of the gas turbine engine showing a sealing assembly.

Referring to FIG. 2, the seal arrangement 20 is disposed in an illustrative embodiment around the shaft 19, adjacent to a ball bearing 22. The seal arrangement 20 prevents lubricating oil 23 from escaping immediate surroundings of the ball bearing 22. The seal arrangement 20 also closes a bearing cavity 21 where air and oil are mixed at a higher pressure P2 than an ambient pressure P1. As such, the seal arrangement 20 is disposed between two zones Z1 and Z2 of different temperatures T1, T2 and pressures P1, P2, with the temperature T1 being significantly higher than the temperature T2. A high pressure differential may increase the contact pressure in the seal arrangement 20, which in turn may increase the heat generation. A dedicated oil jet 25 may be used to cool down a back face of the seal arrangement 20.

The seal arrangement 20 includes an annular seal runner 30 mounted to the shaft 19 and rotating therewith (illustrated by arrow DR), and a carbon static seal 26. As will be seen herein after, the seal runner 30 and the static seal 26 cooperate to define an axial seal. The static seal 26 does not rotate with the shaft 19. The static seal 26 is displaceable axially via a spring (not shown). The seal runner 30 is retained in place on the shaft 19 by a retaining nut 27, while the static seal 26 is supported by a housing 28.

Figure 6:
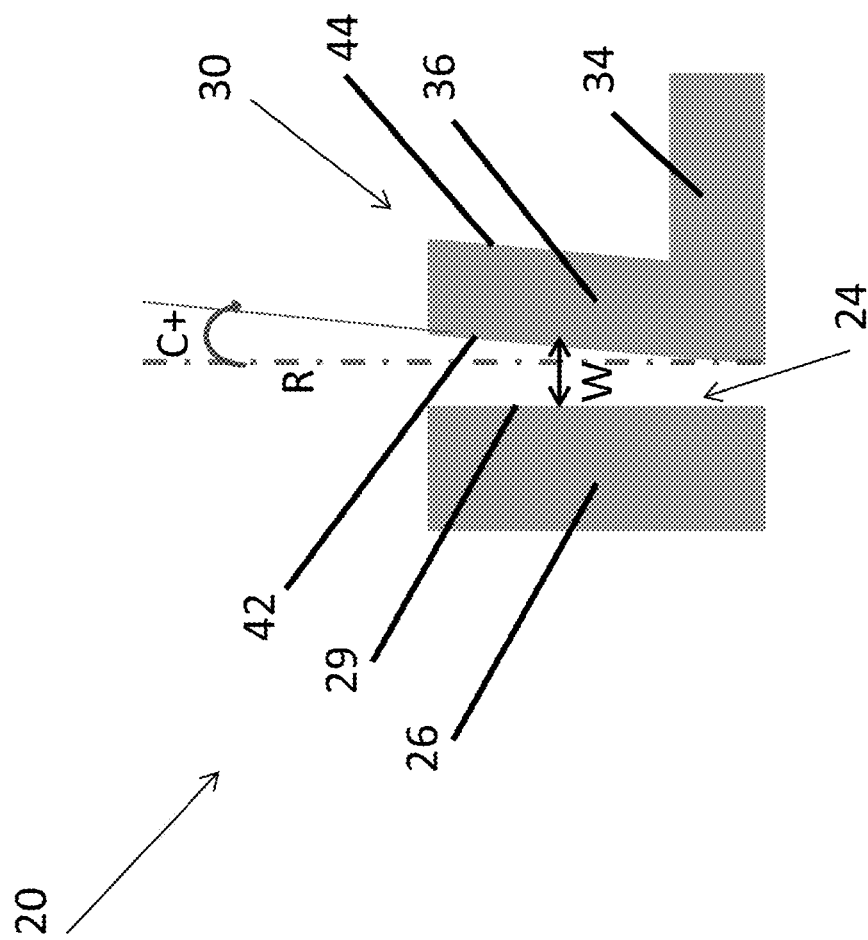
FIG. 6 is a schematic view of the runner of FIG. 5 and an adjacent static seal, with the runner flexed toward the static seal to illustrate a positive coning angle.

The runner 30 includes a generally L-shaped annular body 32, having a generally rectilinear cylindrical portion 34 extending axially around the shaft 19, and a generally rectilinear portion, or sealing lip, 36 extending radially outwardly from one end of the axial portion 34. The sealing lip 36 includes a root portion 35 (shown in FIG. 3) connecting to the axial portion 34, and a tip portion 37 opposed to the root portion 35. The tip portion 37 is a free radial distal end of the sealing lip 36. The static seal 26 is disposed in axially opposed facing relationship to the sealing lip 36. As shown in FIG. 6, the static seal 26 and the sealing lip 36 of the seal runner 30 define an axial gap 24 having a width W. In operation, the sealing lip 36 may abut on the static seal 26 and the gap 24 may be partially closed. When referring to gap herein, it should be understood as to encompassed partially closed gaps.

The body 32 of the seal runner is made of a suitable material resistant to the temperatures and rotational forces experienced by rotating parts in gas turbine engines. In one embodiment, the body 32 may be made of steel and may be covered by a layer of chromium or tungsten carbide coating. It is contemplated that the body 32 could be coated with any other hard coating that has a good wear resistance and low friction coefficient with the mating carbon graphite ring of the static seal 26.

Figure 3:
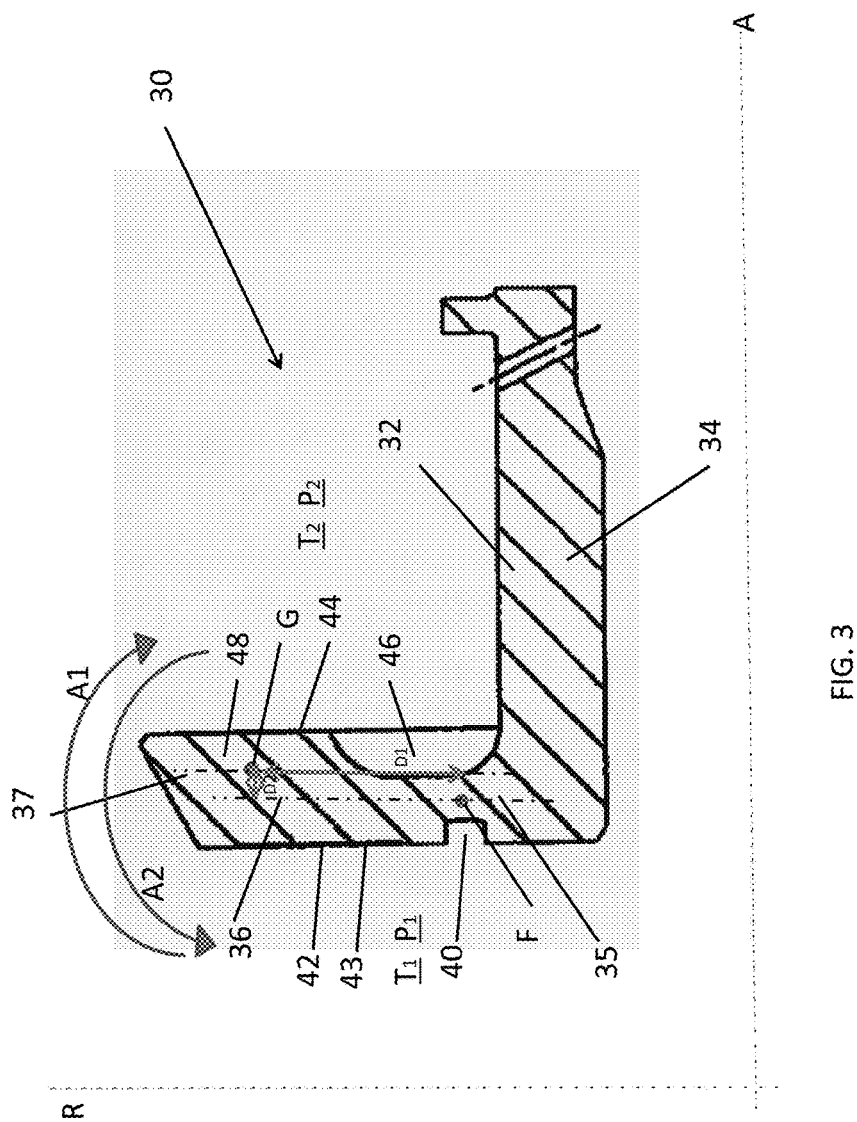
FIG. 3 is a schematic cross-sectional view of a seal runner of the sealing assembly according to one embodiment.

Referring to FIG. 3, the runner 30 according to a first embodiment will be described. The axial portion 34 has a thickness generally constant throughout the length thereof, while the sealing lip 36 has a variable thickness. A shape of the sealing lip 36 may be determined to keep a variation of the width W of the gap 24 minimal at various operation conditions of the gas turbine engine 10 (i.e. whatever the operating condition of the engine 10, the width W has a same or almost same value). The shape of the sealing lip 36 may also be designed to keep the width W of the gap 24 (not just the variation) constant or almost constant at the various operation conditions of the gas turbine engine 10.

While traditional runners are designed to prevent any type of flexion of the sealing lip 36 (for example by making the sealing lip 36 thicker), the runner 30 described herein is designed to allow elastic deformation of the sealing lip 36 under the centrifugal loads. The elastic deformation of the sealing lip 36 described herein is a flexion of the sealing lip 36, which may be characterised by a pivoting or a bending of the sealing lip 36 or a deflection of the tip portion 37 relative to its neutral position when the engine 10 is not running and the runner 30 is at rest, i.e. at ambient temperature and not rotating. Thermal deformation of the sealing lip 36 may be due to the temperature gradient T1–T2 across the runner 30 (described herein as "thermal flexion") and centrifugal forces resulting from the rotation of the runner 30 (described herein as "centrifugal flexion"). The thermal flexion is related to the thermal gradient T1–T2 with little influence on the actual shape of the sealing lip 36. The centrifugal flexion, however, is closely related to a position of the center of gravity G of the sealing lip 36, and therefore of the shape of the sealing lip 36. For example, the closer the center of gravity G to the tip portion 27, the greater the centrifugal flexion. The sealing lip 36 can thus be designed to have a predetermined centrifugal flexion so as to provide a predetermined resulting flexion (i.e. sum of thermal flexion and centrifugal flexion). In one embodiment, the predetermined centrifugal flexion can be determined to compensate for the thermal flexion, so that the resulting flexion be minimal or equal to zero. In one embodiment, the resulting flexion may be constant, zero or else, for some or all the operating conditions of the engine 10 (an operating condition being characterised by a temperature gradient and a speed of rotation of the engine 10).

To assist with the centrifugal flexion of the sealing lip 36, the sealing lip 36 may include a weakening area such as a small notch 40 at the root portion 35, on an axially sealing face 42 of the sealing lip 36 opposite to an associated axially facing sealing face of the static seal 26 the static seal 26. The notch 40 creates a zone of weakness in the sealing lip 36 and as a result a point or zone of flexion F about which the sealing lip 36 may flex when subject to the centrifugal loads. In one embodiment, the sealing face 42 is perpendicular to the axial portion 34 when the engine 10 is not running, meaning that the sealing face 42 is radially oriented. It is contemplated that the notch 40 could be disposed on an opposed face 44 of the sealing lip 36 to the sealing face 42. It is also contemplated that the notch 40 could be a neck (nicks on each of the faces 42 and 44). The notch 40 could have various shapes. For example, it could be a half-circle, a triangle, a rectangular or oblong cut. There may be more than one notch 40. The notch 40 could also be omitted should the sealing face 42 have a smooth increase of its thickness (yet enabling flexion) from the root portion 35 to the tip portion 37. Referring concurrently to FIGS. 2 and 3, it can be appreciated that the notch 40 is disposed radially inwardly or below the static seal 26, and a portion 43 of the axially sealing face 42 facing the static seal 26 is generally straight. While in the illustrated embodiment, the position of the tip portion 37 when the runner 30 is not experiencing centrifugal or thermal forces is on the radial direction (i.e. engine 10 not running), it is contemplated that the sealing face 42 and hence the sealing lip 36 could be at an angle when the engine 10 is not running.

The notch 40 facilitates a flexion of the sealing lip 36. Possible flexions of the sealing lip 36 are illustrated by arrows A1 (away from the static seal 26) and A2 (toward the static seal 26), where the tip portion 37 of the sealing lip 36 is deflected (i.e. offset) relative to the radial direction R. The tip portion 37 may be beveled to favor control of the direction and amplitude of the deflection due to the centrifugal loads. The shape of the sealing lip 36, via its center of gravity G, may determine if the centrifugal flexion will be in the direction of the arrow A1 or the arrow A2, while the thermal flexion direction is determined by the temperature gradient T1–T2. When subject to a temperature gradient, the sealing lip 36 tends to flex toward the region of lower temperature (in the present case in the direction of the arrow A1, toward the zone Z2, that is away from the static seal 26).

The centrifugal flexion is present simultaneously to the temperature flexion. A given temperature gradient T1–T2 is present when the engine 10 is running and as a result is present when the runner 30 is rotated. That is, when the sealing lip 36 is exposed to the temperature gradient T1–T2, it is also rotated at a corresponding speed and centrifugal load. In the case of the engine 10, high speeds of rotation are associated with high thermal gradients, and low speeds of rotation are associated with low thermal gradients. While the temperature flexion is in the direction of the lower temperature, the centrifugal flexion may be in the direction of the arrow A1 or A2 depending on the position of its center of gravity G.

Starting from the known temperature gradient T1–T2, the sealing lip 36 can be designed, in one embodiment, to have a predetermined centrifugal flexion which will keep the resulting flexion of the sealing lip 36 minimal. The resulting flexion may be kept minimal by positioning the center of gravity G of the sealing lip 36 so that the centrifugal flexion is in the direction opposite and of a same or almost same amount than the thermal flexion. It is contemplated that the sealing lip 36 could be designed to have a resulting flexion that may not be a minimal resulting flexion, i.e. the sealing lip 36 could flex under centrifugal loads in amounts and directions other than those for compensating the thermal gradient. For example, the sealing lip 36 may be designed so that under the thermal load and the centrifugal load, the sealing lip 36 is flexed in a predetermined position other than the radial position, the radial position being the position of the sealing lip 36 when the engine 10 is not running.

In the example of FIG. 3, the sealing lip 36 is designed to minimize the resulting flexion. As such, the sealing lip 36 is designed to flex under centrifugal loads in the direction of the arrow A2 for an amount so as to compensate for the flexion in the direction of the arrow A1 due to the temperature gradient. To allow the sealing lip 36 to flex under centrifugal loads in the direction of the arrow A2, the shape of the sealing lip 36 puts its center of gravity G axially offset from the flexion point F in a direction opposite to the direction of the arrow A2. In other words, in order to flex the sealing lip 36 toward the left, the center of gravity G is offset from the flexion point F toward the right (right and left referring to the runner 30 illustrated in FIG. 3). To modulate the amount of flexion of the tip portion 37, the center of gravity G is disposed more or less away radially (distance D1 and axially distance D2) from the flexion point F by a predetermined amount. Added weight at the tip portion 37 (i.e. center of gravity G radially outwardly from the point of flexion F) produces higher flexion when the runner 30 is rotated. To offset the center of gravity G relative to the flexion point F in the axial A direction by the predetermined amount D2 and radial direction R by the predetermined amount D1, the sealing lip 36 includes, in one embodiment, a cut out 46. The cut out 46 is disposed in the axially rearwardly facing face 44 of the sealing lip 36 toward the root portion 35. The cut out 46 shifts the center of gravity G radially toward the tip portion 37 (by the predetermined amount D1) and axially toward the direction A1 (by the predetermined amount D2) compared to a sealing lip of constant width without the cut out 46. The cut out 46 is opposed to the notch 40 but could be radially offset from the notch 40. Instead of a cut out 46, the sealing lip 36 could have added matter at the tip portion 37. The cut out 46 provides a stepped profile to face 44. It is however contemplated that face 44 could have instead a smooth profile with a gradually increasing thickness of the sealing lip 36 form the root portion 35 to the tip portion 37.

The cut out 46 results in an amount of matter 48 (or protrusion) added to tip portion 37 which will influence the flexion generated by the centrifugal loads. The amount of matter 48 needed to shift the center of gravity G to a position that will generate a desired amount of flexion of the sealing lip 36 in a desired direction may be calculated so that it compensates the flexion caused by the temperature gradient T1-T2.

The sealing lip 36 may keep the resulting flexion constant over more than one operating condition of the engine 10. In one embodiment, the sealing lip 36 may keep the resulting flexion constant over all the operating conditions of the engine 10. When the engine 10 is running at a lower operating condition, the runner 30 may be rotated at lower speeds and lower temperature gradients. Because the temperature gradient T1-T2 is related to the speed of rotation of the runner 30 in a proportional manner, the shape of the sealing lip 36 allowing the centrifugal flexion to compensate for the thermal flexion in high operating conditions, may also allow compensation of the thermal flexion by the centrifugal flexion at low operating conditions. As a result, the resulting flexion of the sealing lip 36 (and hence the width W) may be constant for various, if not all, engine operating conditions.

While the shape of the runner 30 may be designed to have a substantially zero resulting flexion, there may be some minimal resulting flexion of the sealing lip 36. Example of minimal resulting flexion is of the order of 2 to 3/1000 of inch by inch. In other cases, as mentioned earlier, the runner 30 may be designed to have a resulting flexion that is non zero or not substantially zero. For example, one may wish to have the resulting flexion toward or away from the static seal 26 so as to minimize either leaking through the gap 24, or over heating by slightly increasing the gap 24. A coning angle may be used to evaluate a position of the sealing lip 36 relative to the static seal 26. The coning angle may indicate if the sealing lip 36 is disposed in a manner that it closes the gap 24 (i.e. flexion in the direction A2 toward the static seal 26), or if the sealing lip 36 is disposed in a manner that it enlarges the gap 24 (i.e. flexion in the direction A1 away from the static seal 26).

Figure 4:
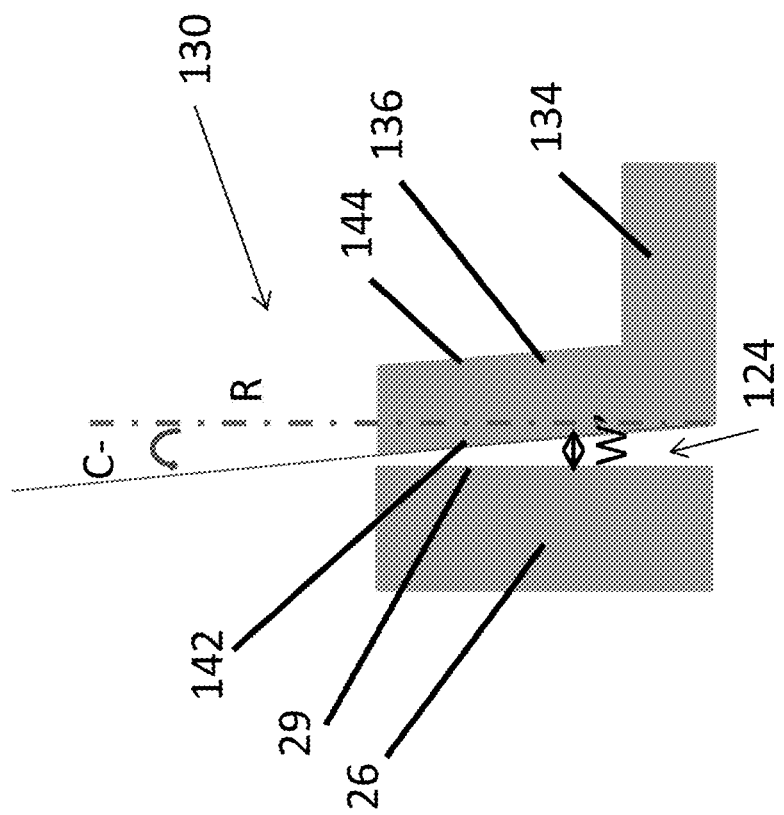
FIG. 4 is a schematic view of a runner of FIG. 3 and an adjacent static seal, with the runner flexed away from the static seal to illustrate a negative coning angle.

FIG. 4 illustrates schematically the runner 30, the static seal 26 and the coning angle resulting from the design of the sealing lip 36. FIG. 4 does not show the sealing lip 36 abutting at least partially the static seal 26 in order to not clutter the drawings. It is contemplated that in operation, the sealing lip 36 may abut at least partially the static seal 26. The coning angle is in this case a negative coning angle C−, i.e. the sealing lip 36 flexes slightly toward the static seal 26 under the resulting flexion. The coning angle is defined at the angle between an axially facing face 29 of the static seal 26 opposite to the sealing lip 36 and its associated axially facing sealing face 42. Because in this illustration the static seal 26 has the face 29 radially aligned, the coning angle is also the angle between the radial direction R and the sealing face 42. The shape of the runner 30 shown in FIG. 3, is designed to provide the negative coning angle C−, i.e. the sealing lip 36 is designed to flex in the direction opposite to that of the temperature gradient yet to an amount slightly higher than that of the temperature gradient, resulting in a slight over compensation of the temperature gradient flexion. The coning angle C− may be very small. In other cases, one may want to design the sealing lip 136 with a greater coning angle. This could be achieved by modulating the added mass so as to modulate a position of the center of gravity G.

Figure 5:
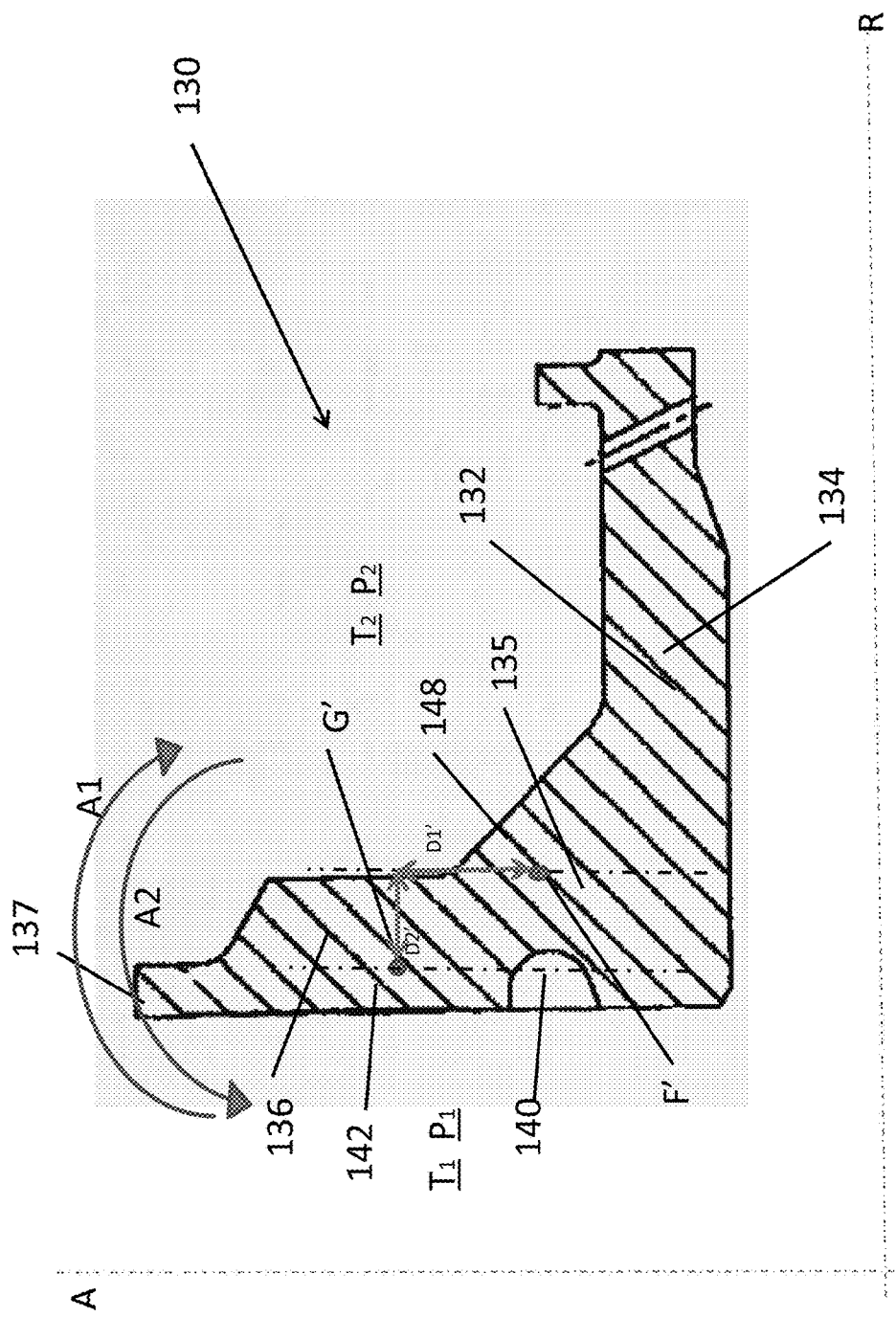
FIG. 5 is a schematic cross-sectional view of a runner of the seal arrangement according to another embodiment.

FIGS. 5 and 6 described below, show an example of runner under compensating of the thermal flexion.

Turning now to FIG. 5, a second embodiment of a runner 130 will be described. The runner 130 is similar to the runner 30 but has a shape which produces a resulting flexion different from of the runner 30.

The runner 130 includes a generally L-shaped annular body 132, having a generally rectilinear cylindrical portion 134 extending axially around the shaft 19, and a generally rectilinear portion, or sealing lip, 136 extending radially outwardly from the axial portion 134. The sealing lip 136 includes a root portion 135 connected to the axial portion 134, and a tip portion 137 opposed to the root portion 135. The tip portion 137 is a free radially distal end of the sealing lip 136. The static seal 26 is disposed axially facing the sealing lip 136. A gap 124 having a width W' (shown in FIG. 6) is disposed between the static seal 26 and the sealing lip 136. Similarly to the sealing lip 36, the sealing lip 136 may be shaped to elastically deform when subject to the various temperatures and rotation speeds at various engine conditions, so that the width W' of the gap 124 remains substantially constant at the various engine conditions.

To enable centrifugal flexion of the sealing lip 136, the sealing lip 136 includes a small notch or nick 140 at the root portion 135, on a sealing face 142 of the sealing lip 136 facing the static seal 26. The nick 140 is similar to the notch 40. It creates a zone of weakness in the sealing lip 136 and as a result a point or zone of flexion F' about which the sealing lip 136 may flex when subject to, at least, the centrifugal loads. As such, the nick 140 will not be described in detail herein again.

Similarly to the sealing lip 36, the sealing lip 136 undergoes centrifugal and thermal loads which result in a flexion of the sealing lip 136. The sealing lip 136 may be designed to minimize the resulting flexion. In other cases, the sealing lip 136 may be designed to have a non-zero resulting flexion which may be constant for the various engine conditions. Opposite to the sealing lip 36, the sealing lip 136 is designed so that the centrifugal flexion. To accomplish this, the sealing lip 136 is designed so that the center of gravity G' disposed axially offset from the flexion point F' in a direction of the direction of the arrow A2 by a predetermined amount D2'. For this shape of runner, the deflection from the centrifugal load may be in the direction of arrow A1 (same direction as the thermal gradient effect). However, the shape of the runner may be such that its stiffness minimizes the deflection due to the temperature gradient. The total deflection may remain in the direction of arrow A1 for the different operating conditions, even for low heat generation cases. In addition, it remains coning angle variation is around 0.0005 in/in across the different engine operating conditions (from Idle to maximum takeoff). Added matter 148 (or protrusion) toward the root portion 135 in the direction of the arrow A1 shifts the center of gravity G' axially toward the direction A1. In addition, to reduce the amount of the centrifugal flexion, the center of gravity G' is disposed radially at proximity of the flexion point F' by a predetermined amount D1'. In order to offset the center of gravity G' toward the flexion point F', the sealing lip 36 has a shape that will provide less weight toward the tip portion 137 and more weight toward the root portion 135 (compared to the design of the sealing lip 36). In this embodiment, the tip portion 137 is thinned compared to the tip portion 37 of the runner 30.

FIG. 6 illustrates schematically the runner 130, the static seal 26 and the coning angle, in the case of a positive coning angle C+ (sealing lip 36 flexes away from the static seal 26). FIG. 6 does not show the sealing lip 136 abutting at least partially the static seal 26 in order to not clutter the drawings. It is contemplated that in operation, the sealing lip 136 may abut at least partially the static seal 26. The shape of the runner 130 shown in FIG. 5, is designed to provide the positive coning angle C+, i.e. the sealing lip 36 is designed to flex in the direction opposite to that of the temperature gradient yet to an amount slightly higher than that of the temperature gradient, resulting in a slight over compensation of the temperature gradient flexion (i.e. resulting flexion is in the direction of the temperature gradient). The runner 130 could also be designed to flex in the direction opposite to that of the temperature gradient yet to an amount slightly lower than that of the temperature gradient, resulting in a slight under compensation of the temperature gradient flexion. Similarly to the sealing lip 36, the sealing lip 136 may keep the resulting flexion constant over more than one operating condition of the engine 10. In one embodiment, the sealing lip 136 may keep the resulting flexion constant over all the operating conditions of the engine 10. When the engine 10 is running at a lower operating condition, the runner 130 may be rotated at lower speeds and lower temperature gradients. Because the temperature gradient is related to the speed of rotation of the runner 130 in a proportional manner, the shape of the sealing lip 136 allowing the centrifugal flexion to compensate for the thermal flexion in high operating conditions, may also compensation of the thermal flexion by the centrifugal flexion at low operating conditions. As a result, the resulting flexion of the sealing lip 136 (and hence the width W) may be constant for various engine operating conditions.

The above description is meant to be exemplary only, and one skilled in the art will recognize that changes may be made to the embodiments described without departing from the scope of the invention disclosed. For instance, while the axial seal arrangement has been described as comprising a stationary static seal, it is understood that other types of suitable seal could be used. Other modifications which fall within the scope of the present invention will be apparent to those skilled in the art, in light of a review of this disclosure, and such modifications are intended to fall within the appended claims.

The invention claimed is:

1. A seal arrangement comprising: a seal runner mounted to a rotary component of a gas turbine engine for rotation about an axis, the seal runner having a sealing lip extending radially outwardly away from the axis between a root portion and a tip portion; and a static seal mounted in axially opposed facing relationship to the sealing lip to provide sealing between a first and a second zone, the static seal and the sealing lip defining an axial gap therebetween, the sealing lip disposed axially between the first and second zones, the first zone having a first temperature (T1) and the second zone having a second temperature (T2), T1 being greater than T2, the difference of temperature between the first and second zones providing a temperature gradient (T1−T2) across the sealing lip and causing the sealing lip to flex in a first direction (A1) towards the second zone, the sealing lip being geometrically configured to have a localized point of flexion between the root portion and the tip portion to allow the sealing lip to flex relative to the axial gap under centrifugal loads, the sealing lip having a center of gravity disposed radially outwardly from the point of flexion by a first predetermined amount and axially offset from the point of flexion towards the second zone by a second predetermined amount to cause the sealing lip to flex under the centrifugal loads in a second direction (A2) opposite to the first direction (A1) towards the first zone, thereby at least partially mitigating the thermal flexion induced by the temperature gradient (T1−T2) across the sealing lip.

2. The seal arrangement of claim 1, wherein the point of flexion is at least in part provided by a notch defined in the root portion of the sealing lip.

3. The seal arrangement of claim 2, wherein the sealing lip has a sealing face opposed to an associated sealing face of the static seal, and wherein the notch is defined in the sealing face of the sealing lip.

4. The seal arrangement of claim 1, wherein the sealing lip has a sealing face opposed to an associated sealing face of the static seal, and wherein a cut-out is formed in the root portion, in a face of the sealing lip opposed to the sealing face.

5. The seal arrangement of claim 1, wherein a thickness of the sealing lip increases from the root portion to the tip portion.

6. The seal arrangement of claim 1, wherein a thickness of the sealing lip is stepped between the root portion to the tip portion.

7. The seal arrangement of claim 1, wherein the first and second predetermined amounts are such that under the centrifugal loads and a thermally induced deformation, the sealing lip is flexed at a predetermined coning angle relative to a position of the sealing lip at rest.

8. The seal arrangement of claim 7, wherein the predetermined coning angle is the same for at least some of the operating conditions of the engine.

9. The seal arrangement of claim 7, wherein the predetermined coning angle is substantially zero and a width of the axial gap is substantially constant.

10. The seal arrangement of claim 7, wherein the predetermined coning angle is negative and a width of the axial gap decreases radially outwardly.

11. A seal arrangement comprising: a seal runner mounted on a rotary part of a gas turbine engine for rotation about an axis; and a static seal cooperating with the seal runner to provide sealing between a first and a second zone, the first zone having a first temperature (T1) and the second zone having a second temperature (T2), T1 being greater than T2, the seal runner having a sealing lip projecting radially away from the axis between a root portion and a tip portion and disposed axially between the first and second zones, the difference of temperature between the first and second zones providing a temperature gradient (T1−T2) across the sealing lip causing the sealing lip to flex in a first direction (A1) towards the second zone, the sealing lip being geometrically configured to have a localized point of flexion near the root portion, the sealing lip having a center of gravity disposed radially outwardly from the point of flexion and axially offset from the point of flexion towards the second zone to cause the sealing lip to flex under centrifugal loads in a second direction (A2) opposite to the first direction (A1) towards the first zone, thereby at least partially mitigating the thermal flexion induced by the temperature gradient (T1−T2) across the sealing lip.

12. The seal runner of claim 11, wherein the point of flexion is at least in part provided by a notch defined in the root portion of the sealing lip.

13. The seal runner of claim 12, wherein the sealing lip has a sealing face configured to cooperate with the static seal and wherein the notch is defined in the sealing face of the sealing lip.

14. The seal runner of claim 11, wherein the sealing lip has a sealing face configured to cooperate with the static seal, and wherein a cut-out is formed in the root portion, in a face of the sealing lip opposed to the sealing face.

15. The seal arrangement of claim 11, wherein a thickness of the sealing lip is stepped between the root portion to the tip portion.

\* \* \* \* \*